Patented June 21, 1927.

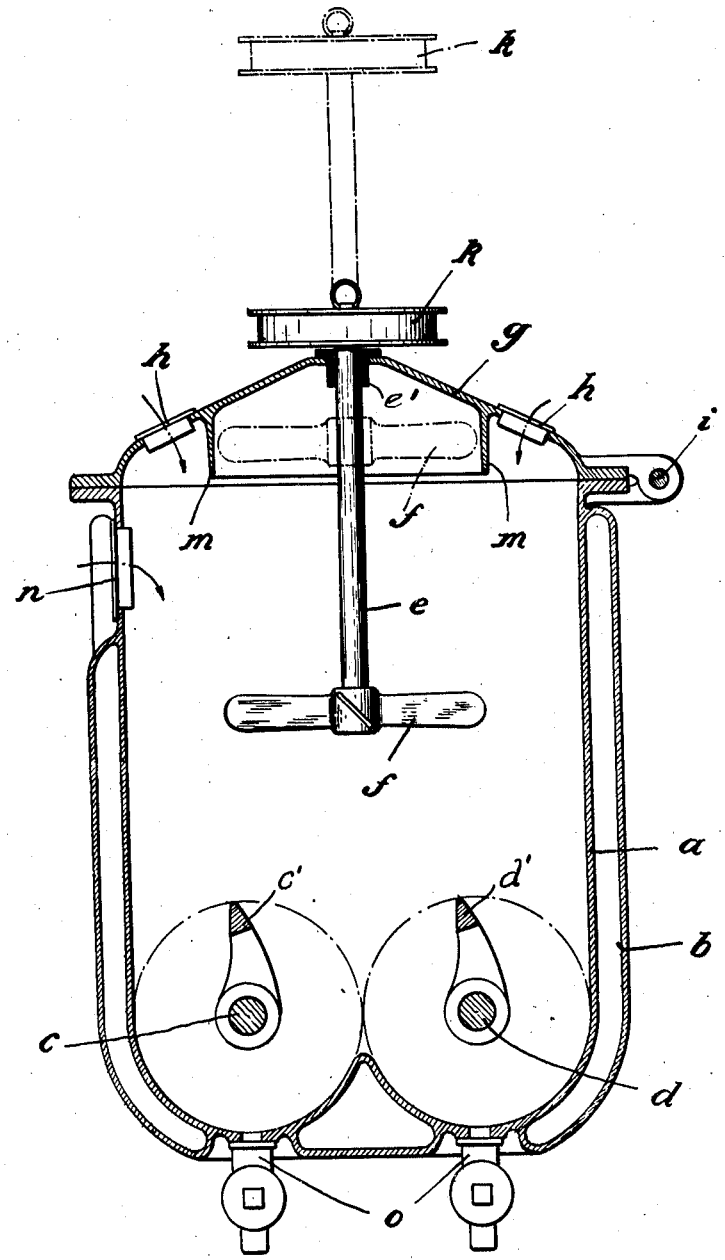

1,632,975

UNITED STATES PATENT OFFICE.

FRITZ KEMPTER, OF STUTTGART, GERMANY.

KNEADING AND MIXING MACHINE.

Application filed August 25, 1924, Serial No. 734,026, and in Germany June 13, 1924.

My invention relates to kneading and mixing machines and more especially to machines of the kind described in which the kneader is horizontal, that is, in which its arms rotate on horizontal shafts. It is an object of my invention to overcome certain drawbacks of this type of machine by combining a vertical agitator with a normal horizontal kneader.

In horizontal kneading and mixing machines plastic and tenacious substances of any kind may be manufactured. If it is desired, however, to dissolve or dilute such substances it will be found that this is feasible to a limited extent only because the horizontal kneader operates satisfactorily only so long as the level of the liquid in the trough is not much above its range. The higher the liquid level is raised, the less will be the influence of the kneader on the liquid above it.

In order to effect considerable dilution it was necessary heretofore to subject the slightly diluted or undiluted material from the kneading and mixing machine to further treatment in a separate agitator the object of which was merely to dilute the material. This method obviously involves loss of time, increased labour and other difficulties particularly in the case of dilution in volatile solvents.

It might appear that the difficulty could be overcome by providing an additional horizontal kneader above the principal one, the trough being extended correspondingly above said principal kneader. The material would then be treated to a sufficient extent in the upper portion of the trough as well, but the additional kneader would be troublesome in charging the machine and might be rendered inefficient by adhering unworked or partly worked material which material, moreover, would thereby be withdrawn from the range of the principal kneader.

All these drawbacks are overcome according to my invention by arranging a vertical agitator above the normal horizontal kneader. The trough is extended correspondingly above said horizontal kneader and the shaft of the agitator is passed through, and preferably carried in a bearing of the lid of the trough. The object of the agitator is merely to dilute the material in the trough above said horizontal kneader.

The agitator is readily removed by removing or raising the lid of the trough or its shaft may be arranged to be raised and lowered. In either case, the agitator is not in the way during the kneading or mixing operation. In the case of volatile solvents, it is possible to perform the kneading and mixing operation and the subsequent agitation without raising the lid.

My novel machine is particularly suitable for dissolving xanthate in viscose solutions and for the dilution of rubber solutions.

In the drawing affixed to the specification and forming part thereof a kneading machine embodying my invention is illustrated in vertical section.

In a trough $a$ which may be provided with a cooling jacket or the like $b$, horizontal shafts $c$ and $d$ are arranged to which are secured mixing and kneading arms $c'$ and $d'$ respectively which rotate past cylindrical faces formed in the bottom of the trough and are operated by means well known in the art and therefore not illustrated in detail.

A vertical shaft carrying agitating blades $f$ extends into the trough $a$ from above. Preferably the shaft $e$ is supported in a bearing $e'$ in the lid $g$ of the trough. The bearing may be provided with a stuffing box. A pulley $k$ may be secured on the free end of the shaft $e$, but any other means may be provided for imparting rotation to the shaft $e$, for instance bevel gears. The drive for the shaft $e$ may also be so constructed as to comprise the hinge pin $i$ of the lid $g$, so that it is possible to open the lid without interfering with the drive of the shaft. For the same purpose, the shaft may be adapted to be displaced axially in its bearing $e'$ together with the pulley $k$ or other driving means, as indicated in dotted lines or adapted to be displaced while the pulley or other driving means remain stationary.

When the machine is being charged with material and while the mixing or kneading apparatus at the bottom of the trough $a$ is in operation, the shaft $e$ may also be raised, as shown in dotted lines, so that the blades $f$ are not struck by the material which is charged at the doors $h$. It is also possible to provide baffles $m$ at the lower face of the lid $g$ which may be annular as shown or I may provide a plurality of independent baffles. Instead of providing charging doors $h$, or in addition to these, I may provide a charging door or charging doors *n* in the vertical wall of the trough. All these doors are so constructed as to close tightly.

At the bottom of the trough drains *o* may be provided.

I wish it to be understood that I do not desire to be limited to the exact details of construction shown and described, for obvious modifications will occur to a person skilled in the art.

I claim:

1. Kneading machine comprising a trough, a kneader in said trough and a rotary agitator mounted in said trough for axial displacement above said kneader.

2. Kneading machine comprising a trough, a lid on said trough, a charging hole in said lid, a kneader in said trough, an agitator in said trough above said kneader, and means for protecting said agitator from contact with matter introduced through said hole.

3. Kneading machine comprising a trough, a lid on said trough with a charging hole porvided in said lid, a kneader in said trough, an agitator mounted in said trough above said kneader for rotary and axial displacement and a flange depending from said lid to protect said agitator, when in raised position, from contact with matter introduced through said hole.

In testimony whereof I affix my signature.

FRITZ KEMPTER.